W. G. A. BONWILL,

Assignor to J. W. WHITE, J. C. WHITE, & H. M. LEWIS, trustees of S. S. WHITE, dec'd.

Electro-Magnetic Dental Plugger.

No. 9,287. Reissued July 13, 1880.

WITNESSES

Wm A. Skinkle.

Roberdeau Buchanan.

INVENTOR

William G. A. Bonwill.

By his Attorneys

Baldwin, Hopkins & Peyton

UNITED STATES PATENT OFFICE.

WILLIAM G. A. BONWILL, OF PHILADELPHIA, PENNSYLVANIA, ASSIGNOR TO JAMES W. WHITE, J. CLARENCE WHITE, AND H. M. LEWIS, TRUSTEES OF SAMUEL S. WHITE, DECEASED.

ELECTRO-MAGNETIC DENTAL PLUGGER.

SPECIFICATION forming part of Reissued Letters Patent No. 9,287, dated July 13, 1880.

Original No. 170,045, dated November 16, 1875. Application for reissue filed June 3, 1880.

*To all whom it may concern:*

Be it known that I, WILLIAM G. A. BONWILL, a citizen of the United States, residing in the city and county of Philadelphia, and State of Pennsylvania, have invented certain new and useful Improvements in Electrical Tooth-Filling Instruments, of which the following is a specification.

My invention relates to the class of tooth-filling instruments now commonly called "electro magnetic dental pluggers," in which the force of electro-magnetism is utilized to impact or condense the fillings in teeth.

The best form of electro-magnetic dental plugger existing prior to the time of invention of my present improvements is, in my opinion, exemplified in Letters Patent granted to me October 15, 1878, as No. 209,006, the application for which was filed on or about November 14, 1871, and my present invention was designed as an improvement upon the invention illustrated in the instrument shown in said patent.

The objects of my invention are to provide an electro-magnetic plugger compact in its parts and comparatively simple in organization; to adapt the instrument to the hand of the operator, so that it may be held and operated with ease and freedom and without tendency to unduly tire or cramp the hand of the operator; to facilitate the securing and removal of the operating-tool, and to regulate or determine with ease and nicety the action of the mallet in delivering its blows upon the tool which is to impact the filling.

The subject-matter claimed, consisting of certain new combinations and organizations of devices, is recited at the close of the specification.

Figure 1:
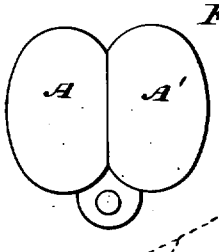
Figure 2:
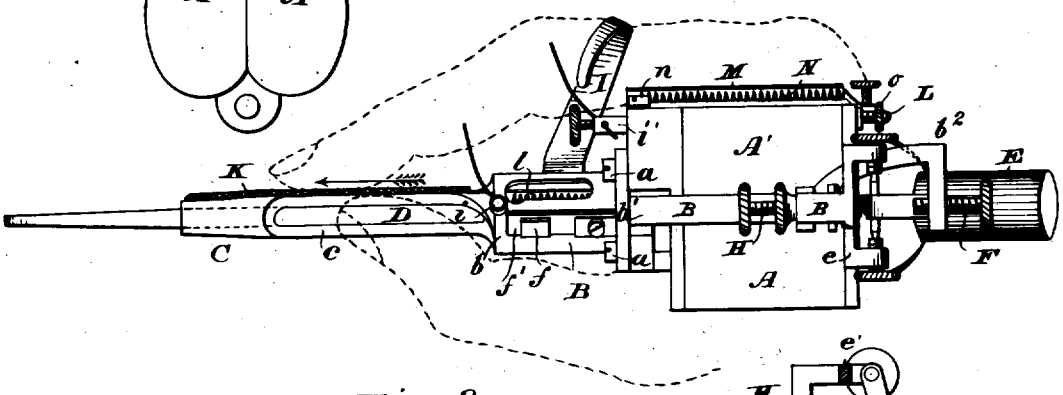
Figure 3:
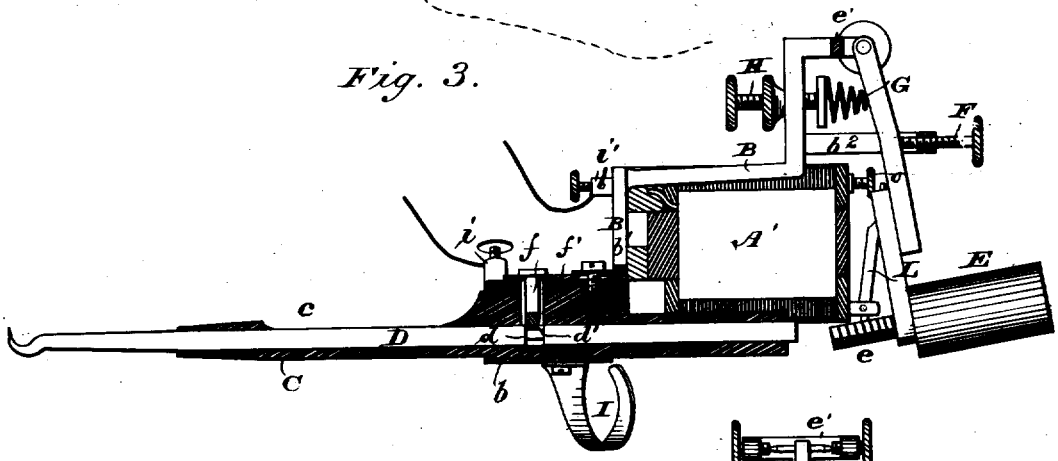
Figure 4:
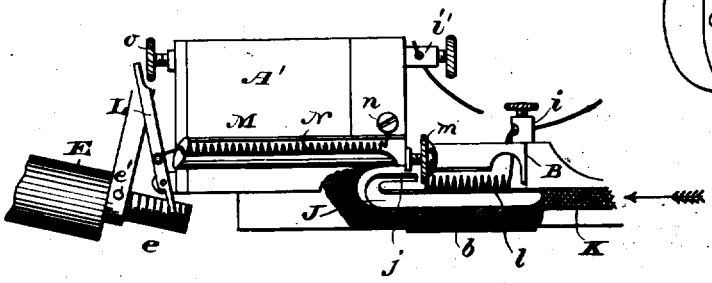
Figure 5:
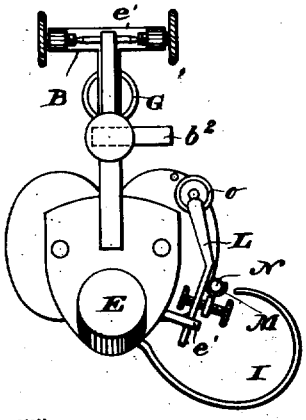

In the accompanying drawings, which illustrate my said new combinations as embodied and organized in the best way known to me at the date of filling my application for the original patent. Figure 1 is a view from the butt-end of the instrument of the double-coil electro-magnet which I employ, showing the preferred manner of organizing said magnet so as to secure lightness and economize space, to permit easy manipulation of the instrument and adapt it to the hand without interfering with the perfect action of the magnet. Fig. 2 is a plan or top view of the instrument complete, said view showing also the manner of holding it in the hand, the hand being indicated by dotted lines. Fig. 3 is a longitudinal central section through the instrument to more clearly illustrate some of its parts. Fig. 4 is a side view, partly in section, of a portion of the instrument, showing the manner of closing the circuit by a finger-piece and of automatically making and breaking said circuit by the automatic circuit-breaker to permit the mallet to give blows upon the tool. Fig. 5 is a view from the butt-end of the instrument when in its operative condition.

An electro-magnet, preferably consisting of two coils, A A′, is connected at front with the frame B of the instrument. Said frame consists of a metallic tubular portion or socket, *b*, projecting forward in front of the electro-magnet and in line with the bottom or under side thereof, and of a major portion, *b′*, rising from the tubular portion *b* in front of the coils of the magnet, (to the cross-bar of which magnet the frame is secured by suitable screws *a*,) and extending backward above said coils a little beyond the butt of the magnet, as shown in Figs. 2 and 3.

The cylindrical plugger handle or casing C forms a portion of the frame of the instrument, and consists preferably of a vulcanite or hard-rubber tube, which passes through and fits snugly in the socket portion *b* of the frame and extends in front of said socket portion a suitable distance to constitute a handle and afford bearing for the operating-tool, said tube or handle also extending in rear of the socket portion *b* beneath the magnet-coils, fitting the groove formed by the two coils of the electro-magnet, as shown in Figs. 1, 3, and 4. The shank of the plugging-tool D is inserted in the socket of the handle or casing C, and projects at its rear end slightly beyond the butt-end of said handle to receive blows from a vibrating armature or mallet, E, through which a set-screw, *e*, is passed to strike upon the plugging-tool when the armature is attracted by the magnet.

The tool is securely held in place in the handle or casing by means of a yielding catch or device, shown as consisting of a spring-pin, *f*, which yields to permit the passage of the butt-end of the tool to the position in which it receives the blows of the mallet while retaining the butt-end of the tool, at that point. Said pin *f* has an abrupt edge or shoulder upon one side adapted to the similar shoulder *d* of the tool D, (the tool having an annular groove formed in it,) whereby the said tool is prevented from being forced back upon the mallet beyond the proper point, while the opposite edge of the said pin, which is adapted to the shoulder *d'* of the tool, is beveled so as to retain the said tool in position under ordinary circumstances, but so that it will yield to permit the withdrawal of the tool by a slight effort. The said tool-retaining pin *f* is secured to a plate, *f'*, rendered adjustable on the portion *b* of the frame B toward and from the mallet, this adjustment permitting wear to be taken up or compensated for.

The mallet or hammer E, constituting the armature of the electro-magnet, is suspended from or jointed to the rear end of the frame B, which rises above the magnet, as aforesaid, by means of a suitable cross-head, *e'*, the ends of which fit in centering-screws carried by the frame, as usual, the armature being so organized and arranged as to vibrate and strike the projecting end of the tool D when attracted by the magnet.

The play or throw of the mallet is regulated or adjusted by means of a set-screw, F, mounted in an extension or arm, $b^2$, of the frame B, and consequently the strength of blow given by the mallet may be determined by said screw.

The armature or mallet is separated from or held from contact with the magnet by means of a coiled spring, G, one end of which bears against the armature-handle and the other against a set-screw, H, mounted on the frame B, the armature closing or vibrating inwardly toward the magnet only when the circuit is closed, and being thrown outward as soon as the circuit is broken by the said spring G. By adjusting the tension of this returning or retracting spring the force of the blow administered by the mallet may be regulated as greater or less resistance to the approach of the armature to the magnet may be afforded.

To enable the instrument to be readily held in the hand and manipulated with ease and comfort to the operator, I fit or arrange the insulated coils A A' of the electro-magnet close together, the adjacent sides of the coils being preferably flattened, as shown in Fig. 1, so that the bulk of the instrument is considerably reduced, and provide the instrument with a guard or loop, I, preferably on the same side of the magnet as the handle or casing C and the operating-tool D, the said guard being shown as secured to the socket portion *b* of the frame B. The index-finger is passed, when the instrument is in hand for operation, through said loop or guard, and extends along the handle or casing C, while the butt-end of the instrument rests in the hollow of the hand between the index-finger and thumb, as is usual in manipulating dental plugging-tools. The handle or casing is slotted or cut away at *c* to permit of the turning of the plugging-tool in the socket by the thumb during the operation of the instrument, as in my Patent No. 209,006, before referred to.

I believe I am the first ever to have so organized an electro-magnetic mallet plugger that it can be held in the hand of the operator in the same manner and with the same ease in manipulation as the ordinary hand-tools, and with as little tendency to cramp or tire the hand or fingers, and this capacity of my improved instrument is due in great part to the compact arrangement of the coils and to the organization of the finger guard or loop with the magnet and tool which I have shown and described. I also reduce the size of the coils and the weight of the mallet and yet obtain as sharp or a sharper blow with the same battery, for the striking portion of the mallet, owing to the position of the tool beneath the magnet, is extended over the coils, which enables me to obtain a longer leverage and to strike with the end instead of with the side of the weighted portion of the mallet. (See Fig. 3.) This lightness of the instrument is also of advantage when soft blows in very quick succession are to be struck.

One important feature of my invention is the disposition of the frame, the handle, the finger guard or loop, and the mallet relatively to the magnet and operating-tool, the arrangement being such as to so lower the center of gravity in the working position of the instrument as to enable it to rest solidly upon the operator's hand.

The hooked guard or loop serves to determine the position of and to retain the instrument in the hand, and much facilitates its operation. Said guard may be in the form of a ring, but I prefer that it should be hooked, as shown. The guard may also be rendered adjustable upon the instrument to accommodate long or short fingered operators.

The circuit, when the instrument is connected with a suitable battery by a flexible connection which permits the instrument to be moved freely about without interrupting the passage of the current of electricity, is normally open, and in order to throw the instrument quickly into and out of action I provide a circuit-closer which is actuated by slight pressure of the finger in one direction (arrow 2, Fig. 2) to close the circuit, and actuated by a spring in the other direction (arrow 1, Fig. 4) to automatically open said circuit when the pressure is removed.

The circuit-closer is shown as consisting of a hooked or forked slide, J, fitted in a seat in the vulcanite handle, and is connected by a spiral spring, *l*, with a binding-screw, *i*, constituting part of the circuit.

The long arm or portion *j* of the slide J is fitted snugly in a guide groove or recess in the handle C, while the forward end of the short arm *j'* constitutes a contact-point which makes contact with a set-screw, *m*, also constituting part of the electric circuit.

In order to bring the two contact-points together to close the circuit, I connect the slide J with a sliding finger-piece, K, mounted on the exterior of the casing or handle C, a slight forward movement of which by the finger is sufficient to close the circuit. The circuit is immediately broken upon relieving the finger-piece of pressure by the action of the spring *l*, which separates the contact-points and retracts the finger-piece to its normal position, as shown in Fig. 4.

The sliding finger-piece K is roughened, preferably on its surface upon which the finger rests, to prevent the finger, when applied to the slide to close the circuit, from slipping thereon.

When the circuit of which the electro-magnet forms a part is completed by the circuit-closer the armature will of course be attracted by the magnet; and in order to make and break or interrupt the circuit with great rapidity, so as to obtain blows in rapid succession upon the plugging-tool, I employ an automatic circuit-breaker mounted upon the instrument itself in addition to the circuit-closer J, above described.

I do not intend, however, to be understood as claiming broadly the invention of a plugging-instrument provided with a circuit-closer actuated by the operator when the instrument is to be used and an automatic circuit-breaker, as that has been before patented.

The automatic circuit-breaker is shown as consisting of a pivoted lever, L, to which the current is conducted from the circuit-closer J through the adjustable screw *m*, insulated metallic casing M, secured at one side of the magnet, and spiral spring N, inclosed in said casing M, the said spring being so organized as to exert its force upon the lever L above its pivotal point, so as to maintain or bring the upper end of the lever in contact with a contact-screw, *o*, mounted in the insulated head of the coils, said screw *o* being connected with the wire forming the coils of the magnet, through which the current passes to the binding-screw, *i'*, and from thence to the battery.

One end of the spring N, to which the circuit-breaker is connected, is wound upon a screw, *n*, by turning which the power of said spring can be increased or diminished as desired, and consequently the rapidity of the recoil of the circuit-breaker and the rapidity of the blows of the mallet upon the tool may be regulated by means of said spring.

The contact-screw *o* is preferably rendered adjustable, so that the effects of wear may be taken up or compensated; and the bearings both of the lever L and of the vibrating mallet are also rendered adjustable for the same purpose.

To prevent oxidation of the bearings of said lever L the current is not permitted to pass through them, but passes from the spring N directly through the long arm of the lever to the contact-screw *o*.

The operation of the instrument is as follows: The point of the operating-tool is directed to the filling which is to be impacted or condensed, and slight pressure upon the finger-piece is sufficient to move it in the direction indicated by arrow 2 in Fig. 2 to close the circuit. The current of electricity passes, when the circuit is thus completed, from the battery through the flexible connecting-wires to the binding or connecting post *i*, thence through the spring *l*, circuit-closer J, contact-screw *m*, casing M, and spring N to the automatic circuit-breaking lever, thence through the contact-screw *o* and wire coils of the magnet to the binding-post *i'*, and thence through the return-wire to the battery. The armature is then attracted toward the magnet and delivers its blow upon the butt-end of the plugging-tool, and at the same time the short arm of the circuit-breaking lever is struck by a hard-rubber or other non-conducting projection, *e'*, carried by the mallet, which forces the upper or contact end of the lever away from the contact-screw *o*, thus automatically breaking the circuit at the point *o*. This enables the mallet to be thrown away from the magnet by the separating-spring and the lever to be brought back against the screw *o* by the spring N, thus again closing the circuit, which is broken at the next stroke of the mallet, as before, which operation of automatically making and breaking the electric circuit is very rapid and continues as long as the operator presses forward the finger-piece to close the circuit through the circuit-closer J.

The several parts of the instrument are so arranged in respect to each other that the circuit is not broken by the mallet until the latter has almost or quite delivered the blow, the full power of the mallet being thus obtained and ample time being afforded for its recoil before the circuit is again completed by the circuit-breaking lever.

My improvements, although especially adapted for impacting tooth-fillings, can be applied to other uses in the arts where a hammer is to be actuated.

I claim as my invention—

1. The combination, substantially as hereinbefore set forth, of the magnet, the armature or mallet, the finger-piece forward of the magnet to close the circuit, and the automatic circuit-breaker mounted upon the instrument and actuated by the mallet.

2. The combination, substantially as hereinbefore set forth, of the tubular handle of the instrument, the magnet mounted thereon, the armature or mallet, the finger-piece to close the circuit, and a spring to automatically open the circuit when the pressure of the finger is removed.

3. The combination, substantially as hereinbefore set forth, of the magnet, the mallet, the automatic circuit-breaker, the spring acting upon said circuit-breaker, and a device for varying the force or tension of said spring to increase or diminish the rapidity of recoil of the said circuit-breaker.

4. The combination, substantially as hereinbefore set forth, of the magnet having coils with flattened sides fitted close together, the tubular handle for the operating-tool extended beneath said coils, and the vibrating mallet to impart a series of blows in rapid succession to the tool.

5. The combination, substantially as hereinbefore set forth, of the magnet having coils with flattened sides fitted close together, the tubular handle extended beneath said coils, and a finger-guard upon the same side of the magnet as the said handle.

6. The combination, substantially as hereinbefore set forth, of the frame of the instrument, the magnet above which said frame extends, the mallet pivoted to said frame, the tubular handle extended beneath the said magnet, and the finger-guard at the same side of the instrument as the said handle.

7. The combination, substantially as hereinbefore set forth, of the tubular handle of the instrument, open at both ends, the tool-retaining device having a beveled side or portion, and the tool having one shoulder to determine the extent of its insertion in the handle, and another shoulder which retains it in said handle under ordinary circumstances, but permits it to be withdrawn with a slight effort, owing to the beveled retaining device.

8. The combination, substantially as hereinbefore set forth, of the tubular handle, the mallet, and the tool-retaining device adjustable from and toward the mallet.

In testimony whereof I have hereunto subscribed my name.

WM. G. A. BONWILL.

Witnesses:
FRANK L. HISE,
ALBERT P. ROOT.